United States Patent [19]

Cleary et al.

[11] Patent Number: 5,434,604
[45] Date of Patent: Jul. 18, 1995

[54] SPRAY-PAINTING SYSTEM WITH AUTOMATIC COLOR CALIBRATION

[75] Inventors: Arthur L. Cleary, Laconia; Peter L. Duffield, Meredith, both of N.H.

[73] Assignee: Vutek Inc., Meredith, N.H.

[21] Appl. No.: 885,945

[22] Filed: May 19, 1992

[51] Int. Cl.⁶ .................................................. B41J 2/01
[52] U.S. Cl. ........................................ 347/19; 347/43; 358/504
[58] Field of Search .................... 347/19, 43, 21, 3; 358/504, 406

[56] References Cited

U.S. PATENT DOCUMENTS

| | | | |
|---|---|---|---|
| 4,914,522 | 4/1990 | Duffield et al. | 347/3 X |
| 4,999,651 | 3/1991 | Duffield et al. | 347/3 |
| 5,053,866 | 10/1991 | Johnson | 358/504 |
| 5,081,529 | 1/1992 | Collette | 358/504 |
| 5,107,332 | 4/1992 | Chan | 358/518 |
| 5,276,459 | 1/1994 | Danzuka et al. | 347/19 X |

FOREIGN PATENT DOCUMENTS

3-272862  12/1991  Japan .................................. 347/43

Primary Examiner—A. T. Grimley
Assistant Examiner—Nestor R. Ramirez
Attorney, Agent, or Firm—E. T. Barrett

[57] ABSTRACT

An automatic system for the spray painting of color images in which accurate color reproduction is achieved by a separate look-up table generated for each jet and stored in the computer memory. During the reproduction of an image, the computer uses the look-up tables to determine the pulse width of an air modulation stream to reproduce the precise color density called for by the input data. Because slight variations in the characteristics of two jets spraying the same color would produce objectionable lining in the image, a separate look-up table is provided for each jet. A color test image is generated for a selected jet by successively varying the width of the pulse modulation from the minimum to the maximum. For example, while the jet is making a single scan across the medium, the pulse width modulation of the air stream is varied in 256 separate steps to produce a test image that varies from the lightest to the darkest density of the particular color being sprayed. This pattern is scanned by a densitometer that delivers its output to the computer. The position of the densitometer along the color test image is correlated with the modulation pulse width that produced that particular color density and this information is stored in a look-up table for use during the generation of a reproduced image. A dark current is measured by the densitometer and subtracted from the calibration readings so that the calibration is independent of ambient illumination.

13 Claims, 2 Drawing Sheets

SPRAY-PAINTING SYSTEM WITH AUTOMATIC COLOR CALIBRATION

BACKGROUND OF THE INVENTION

1. Field of the Invention

This invention relates to automatic spray systems in which a number of spray heads traverse a medium to produce a color-image in response to a coded input. In a particular system, an image to be copied is scanned optically and the signals from the scanner control the characteristics of each of the spray jets to accurately reproduce the image. Such spray systems are used in preparing outdoor advertising displays, for the reproduction of art work and for other applications. More particularly, the invention relates to an automatic spray system in which a test image formed under the control of a computer for each basic cole, is scanned by a densitometer and the information from the densitometer utilized for preparing a set of look-up tables that relate the spray characteristics of each jet spray head to reproduce the appropriate color density.

2. Description of Related Art

Many different kinds of automatic spray systems have been devised. U.S. Pat. No. 1,709,926 describes a system in which three separate jets, each spraying one of the primary colors, are individually controlled by electrically-operated valves to produce a blended color image. U.S. Pat. No. 3,553,371 describes a multi-jet spray system in which the flow of ink from each of the jets is controlled either by controlling the air pressure that produces the spray or by direct control of the ink supply. The medium to be sprayed is carried by a rotating drum and the jets are moved laterally across the face of the drum to produce a spiral pattern. U.S. Pat. No. 4,914,522 describes a multi-jet spray system in which the density of each color sprayed on the medium is controlled by pulse-width modulation of an air stream that atomizes the ink. These and many other systems for controlled spray painting of mediums have been devised. Throughout these developments, the accurate reproduction of colored images has remained a recurrent problem. In systems in which two sets of jets produce an interleaved scanning pattern, it is even more important to maintain precise control over the color density produced by each of the jets.

The spray characteristics of the individual jets are quite different. Slight variations in the dimensions or shape of jet components influence the amount and format of the delivered spray. Moreover, the characteristics of a single jet may change during a period of extended use, for example, from the drying of ink on or adjacent to the jet. Any such variations cause a variation in the rate at which the ink is delivered to the medium and a change in the color density of the pattern. To reproduce a colored image with accuracy, it is necessary that each jet be individually controlled in such manner as to produce the prescribed color density. In systems in which two sets of heads scan alternate lines of the image, any variation between the operating characteristics of the two sets of heads will produce lining on the image. Thus, even if the adjustment is such as to provide acceptable color reproduction, the image may be impaired by the presence of lining in the image caused by the slightest variations in the spray characteristics of the two sets of heads. In an automatic spray system in which color density is controlled by pulse width modulation, it is necessary to have an absolute correlation between the pulse width and the resulting color density.

SUMMARY OF THE INVENTION

The present invention provides an automatic system in which a separate look-up table is generated for each jet and stored in the computer memory. During the reproduction of an image, the computer uses the look-up tables to determine the pulse modulation width necessary to reproduce the precise color density called for by the input data. Because slight variations in the characteristics of two jets spraying the same color would produce objectionable lining in the image, a separate look-up table is provided for each jet.

A color test image is generated for a selected jet by successively varying the width of the pulse modulation from the minimum to the maximum. For example, while the jet, is making a single scan across the medium, the pulse width modification of the air stream is varied in 256 separate steps to produce a test image that varies from the lightest to the darkest density of the particular color being sprayed. This pattern is scanned by a densitometer that delivers its output to the computer. The position of the densitometer along the color test image is correlated with the modulation pulse width that produced that particular color density and this information is stored in a look-up table for use during the generation of a reproduced image.

To compensate for variable ambient lighting conditions, a "dark" current measurement is made with no light reflected from the test pattern. This dark current is subtracted from the densitometer readings during the calibration run so that the calibration is independent of the particular ambient lighting conditions at the time of calibration.

DESCRIPTION OF THE PREFERRED EMBODIMENT

Figure 1:
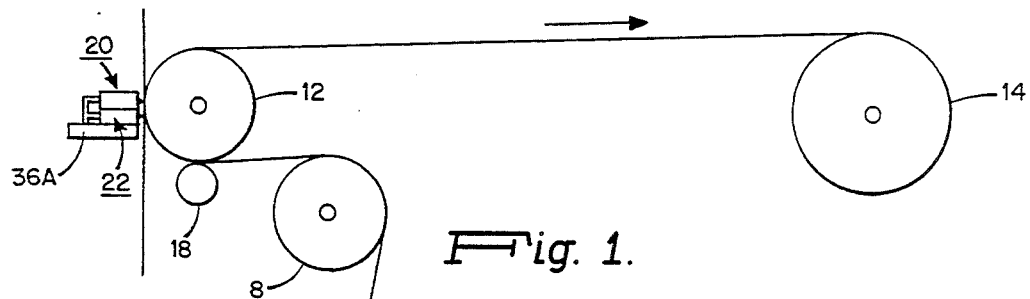
FIG. 1 is a diagrammatic view illustrating the general operation of the spray portion of the automatic system.
Figure 2:
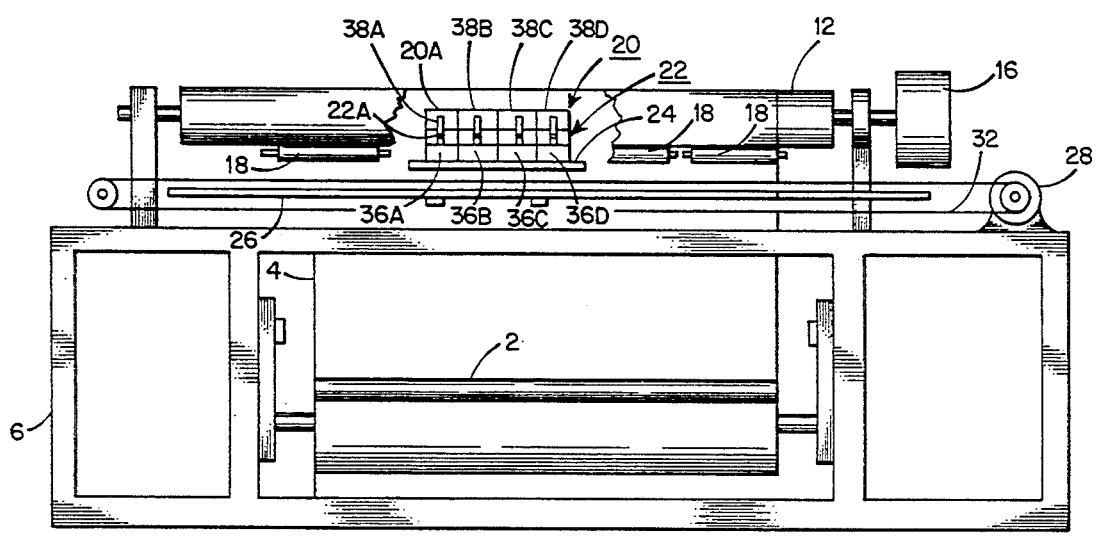
FIG. 2 is a diagrammatic front view of the automatic spray system of FIG. 1.
Figure 3:
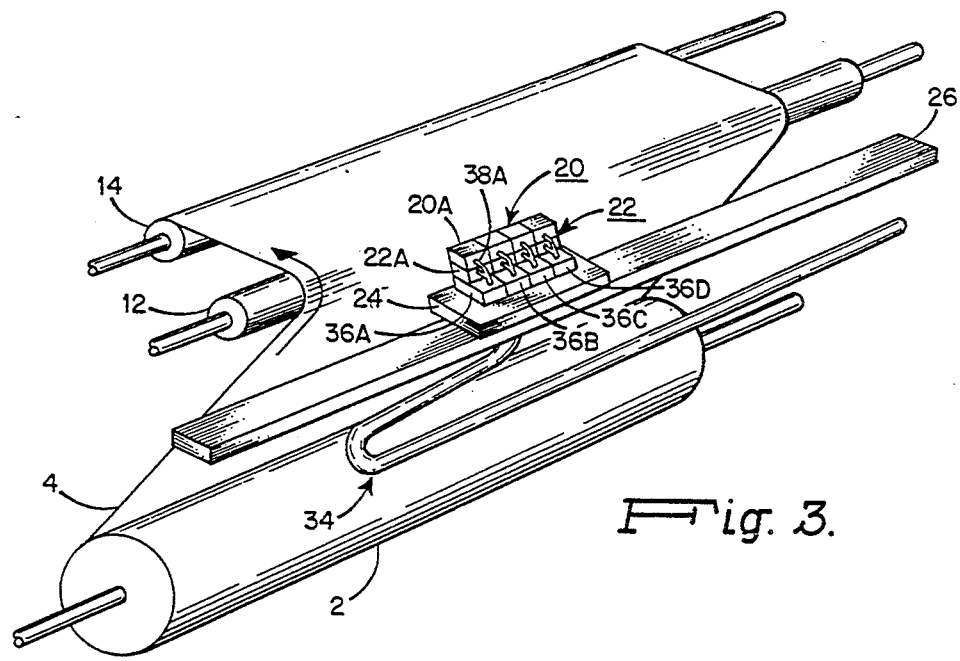
FIG. 3 is a diagrammatic perspective view of the spray system shown in FIG. 2.

As shown by FIGS. 1-3, a roll 2 of imaging material 4, which may be paper or vinyl or some other suitable sheet material, usually white, is supported by the frame 6 of the imaging system. The medium passes over an idler roller 8 (shown only in FIG. 1) around a rubber-covered drive roller 12 and onto a take-up roller 14.

The drive roller 12 is driven by a stepper motor 16 (FIG. 2) that incrementally advances the medium by successive scanning lines. A series of rollers 18, which press the medium 4 against the surface of the roller 12, provide support for the roller 12 and prevent slippage between the roller and the medium 4. The take up roller 14 is driven by a suitable drive mechanism (not shown), of any of the well known mechanisms for applications of this kind, that transmits sufficient torque to maintain the medium 4 under appropriate tension.

Two sets of ink jet spray heads, generally indicated at 20 and 22, are positioned adjacent the surface of the medium 4 where it passes over the drive roller 12. The heads 20 and 22 are supported by a carriage 24 that is slidably mounted on a rail structure 26 (FIG. 3) and is driven back and forth horizontally across the medium 4 by a motor drive 28 (FIG. 2) and a reversing drive cable 32. Ink for the spray heads is supplied from a remote storage center (not shown) that is connected by flexible supply tubes, diagrammatically illustrated at 34 in FIG. 3, to four small ink reservoirs 36A, 36B, 36C and 36D supported by the carriage 24. As used here and in the claims, "ink" means a color medium having either dyes or pigments as the coloring agent. Each of the four reservoirs carries one of four colors of ink, typically cyan, magenta, yellow and black, and is connected by the supply tubes 38A, 38B, 38C and 38D Go the ink spray heads. For example, as shown in FIGS. 2 and 3, the ink reservoir 36A, which carries the cyan ink, is connected by the tube 38A to the ink spray head 20A and to the ink spray head 22A. The other spray jets are connected by similar supply tubes to the reservoirs 36B, 36C and 36D.

Figure 4:
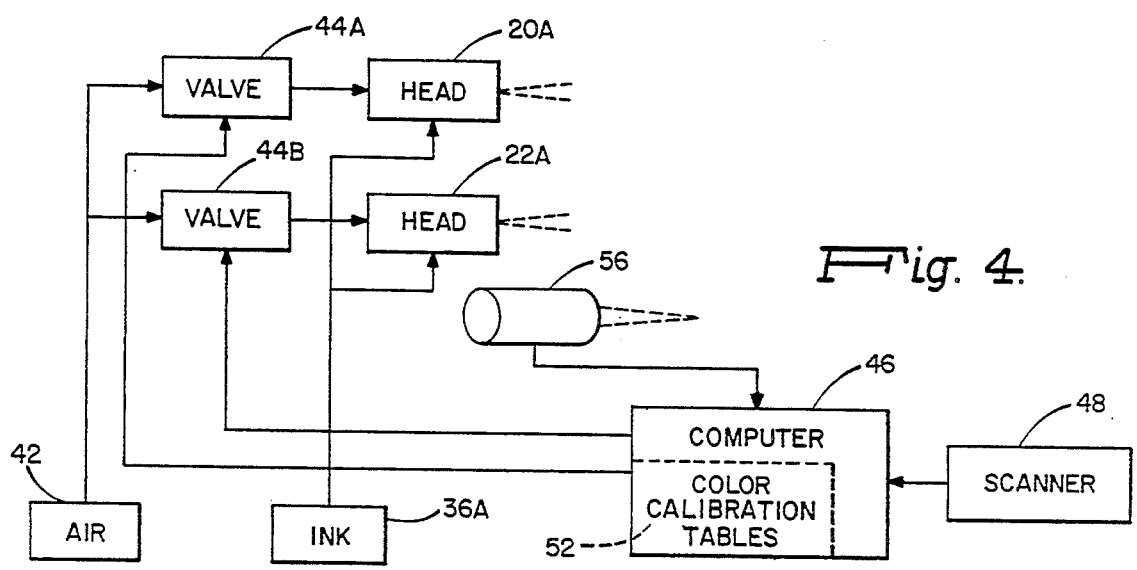
FIG. 4 illustrates diagrammatically the general operation of the overall system.

The general method of operation of the system is illustrated by FIG. 4 which shows only two spray heads 20A and 22A. The other six spray heads operate in the same manner. A source 42 of constant pressure compressed air is connected to two modulation valves 44A and 44B. The valve 44A controls the flow of air to the head 20A by delivering short pulses of high-velocity air to the head. The air flows across an ink meniscus in the spray head 20A to draw ink from the ink reservoir 36A and atomize it onto the medium 4. The density of the color produced is varied by varying the duration of the air pulses delivered by the valve 44A which is controlled by a computer 46. This system of control by pulse width modulation of an air stream is described in U.S. Pat. No. 4,914,522. The air stream is modulated to reproduce an image being scanned by a conventional optical scanner 48 or to produce an image from previously recorded dam. The operation of the valve 44A is controlled in accordance with information from a set of color look-up tables 52 stored in the computer memory. The ink jet spray heads may, for example, be similar to those described in U.S. Pat. No. 4,914,522.

Figure 5:
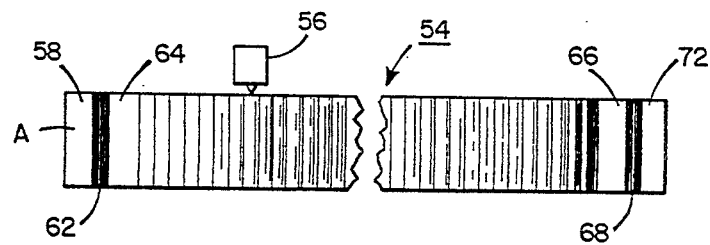
FIG. 5 illustrates a test image for creating a color look-up look-up table.

To provide the basic data for the look-up tables 52, a single selected spray head is operated and is supplied with air that is pulse modulated in increasing pulse widths as the carriage 24 scans across the medium 4. For example, the pulse width may be varied in 256 separate steps so that the test pattern produced is a line of a single color extending across the medium 4 with increasing density. A number of identical scans are made in order to produce a test image of the desired vertical width. The result is a test image such as that illustrated at 54 in FIG. 5.

To provide the calibration, a densitometer, illustrated diagrammatically at 56, (FIGS. 4 and 5) is mounted on the carriage 24 and is connected to the computer 46. To perform the calibration, the densitometer is positioned at the point indicated at A in FIG. 5 and is then moved toward the right at a constant rate of speed. The densitometer passes first over a white section 58 of the test image, in which no ink has been sprayed upon the medium, followed by an initial fiducial mark 62 of maximum density for the particular color being measured or some other dark color. This maximum density is produced by a series of spray pulses each of maximum duration with minimum time intervals between successive pulses. As the densitometer 56 traverses the fiducial mark, the densitometer readings rise rapidly to a maximum value. Because the densitometer beam has a finite width, but narrower than the width of the fiducial mark 62, the density readings rise gradually to a peak value and then drop back to the original value as the densitometer traverses a second white strip indicated at 64. This information, in the form of digital numbers indicating the density reading, is fed into the computer 46 which then determines the physical position of the center of the initial fiducial mark 62.

After passing over the initial fiducial mark, and the narrow white strip 64, the densitometer passes over the test image 54 formed of 256 discrete steps of increasing color density. At the end of the test image, the densitometer traverses a narrow white strip 66 positioned between the last step, the darkest color density of the test image, and a terminal fiducial mark 68 followed by another white space 72. The mark 68 is similar to the initial mark 62 and is of the highest density and is of known width. The sudden rise in transmitted density readings indicates the terminal fiducial mark 68 and permits determination of the center-line of the mark 68. To smooth minor variations in the readings, multiple scans of the test image may be made with identical parameters and the average of the readings used for each step of the test image.

Figure 6:
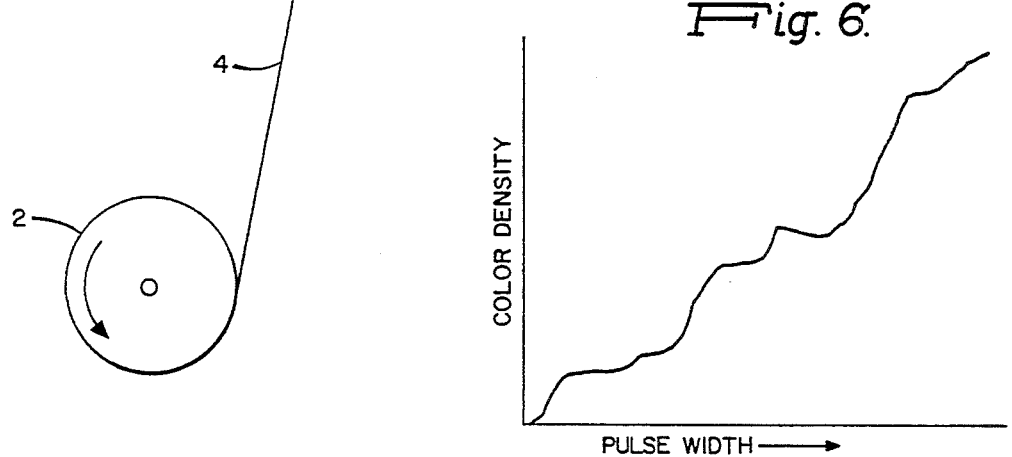
FIG. 6 is a typical curve representing the relationship between density and the modulation pulse width for one color as produced by a particular spray head under the prevailing conditions.

The foregoing procedure permits determination of the precise distance between the initial fiducial mark 62 and the terminal fiducial mark 68 based on the known constant scanning speed of the carriage 24. Since all of the 256 color steps of the test image are of equal width, the density reading received by the computer can be correlated for each step of the test image 54. Because the modulation pulse widths of the air stream that produced each step of the test image are known, the color correction tables 52 can be constructed in which each reading of the densitometer is correlated precisely with the pulse modulation width required to produce that color density with the characteristics of the selected jet spray head. FIG. 6 shows a typical curve of the relationship between pulse width and the densitometer readings.

To compensate for ambient light conditions and paper variability, a densitometer reading is taken at the beginning of each calibration program that measures the reflection from the medium while being exposed to surrounding ambient illumination. This paper density value is fed into the computer 46 where it is subtracted from the densitometer readings during the color calibration so that the color correction is independent of ambient lighting conditions.

A separate calibration exactly like the one just described is performed for each of the eight jet spray heads resulting in a different look-up tables. When an image is scanned, the color elements indicated by the scanner 48 are correlated by the computer 46 using the look-up tables 52 to produce the precise modulation pulse width required to reproduce the color of the image being scanned.

For most applications, the test image should include at least 128 separate discrete color steps each forming one element of the look-up table. Preferably, the test image is formed of 256 separate discrete color steps.

The densitometer used may be any of a number of commercially available densitometers and so is not described in detail here. Preferably, the densitometer measures the color density by reflected light and carries a pulsed light source so that the image, after correction for the dark current and ambient light, is always examined as under identical conditions of illumination. Typically, the densitometer makes a large number of individual measurements of each color sample and an integrated average of the individual measurements is transmitted to the computer to be used in creating the look-up tables. A stream of low pressure air may be maintained around the perimeter of the active area of the densitometer to prevent fogging of the densitometer lens or light source by the color mist from the spray heads.

We claim:

1. The invention claimed is a computer-controlled spray painting system for the reproduction of color images comprising
   a computer,
   a medium to be painted,
   a plurality of spray heads,
   means causing said spray heads to scan successive lines across said medium,
   an ink source connected to said spray heads,
   air modulation means for controlling the delivery of ink by each of said spray heads in accordance with control signals from said computer,
   means for generating a test image on said medium by a selected one of said spray heads having an area of increasing color density,
   a densitometer,
   means causing said densitometer to scan said test image,
   means coupled to said densitometer and said computer for correlating specific color densities of the test image with said control signals that produced the color density,
   means for generating a signal that is a function of the prevailing ambient light and the reflective characteristics of said medium and compensating said control signals to eliminate the effects of changes in ambient illumination,
   means in said computer for recording a look-up table correlating said control signals with the associated color density, and
   means operative during the reproduction of a color image for modifying said control signals for the selected spray head in accordance with data from said look-up table.

2. The invention claimed is a computer-controlled spray painting system for the reproduction of color images comprising
   a computer,
   a medium to be painted,
   a plurality of spray heads,
   means causing said spray heads to scan successive lines across said medium,
   an ink source connected to said spray heads,
   air modulation means for controlling the delivery of ink by each of said spray heads in accordance with control signals from said computer,
   means for generating a test image on said medium by a selected one of said spray heads having an area of increasing color density,
   a densitometer,
   means causing said densitometer to scan said test image,
   means coupled to said densitometer and said computer for correlating specific color densities of the test image with said control signals that produced the color density,
   means in said computer for recording a look-up table correlating said control signals with the associated color density,
   means operative during the reproduction of a color image for modifying said control signals for the selected spray head in accordance with data from said look-up table,
   means connecting a second one of said spray heads to the same ink source as said selected spray head,
   means for generating a second test image on said medium by said second spray head,
   means for producing therefrom a second look-up table, and
   means operative during the reproduction of a color image for modifying the control signals for said second spray head in accordance with data from said second look-up table.

3. The invention claimed is a computer-controlled spray painting system for the reproduction of color images comprising
   a computer,
   a medium to be painted,
   a plurality of spray heads,
   means causing said spray heads to scan successive lines across said medium,
   an ink source connected to said spray heads,
   air modulation means for controlling the delivery of ink by each of said spray heads in accordance with control signals from said computer,
   means for generating a test image on said medium by a selected one of said spray heads having an area of increasing color density,
   said test image including an initial fiducial mark of contrasting color from said medium indicating the beginning of said test image, and
   a terminal fiducial mark of contrasting color from said medium indicating the end of said test image,
   a densitometer,
   means causing said densitometer to scan said test image,
   means coupled to said densitometer and said computer for correlating specific color densities of the test image with said control signals that produced the color density,
   means in said computer for recording a look-up table correlating said control signals with the associated color density, and
   means operative during the reproduction of a color image for modifying said control signals for the selected spray head in accordance with data from said look-up table.

4. Apparatus as claimed in claim 3 including
   a carriage supporting said selected spray head and said densitometer, and
   means causing said carriage to traverse the width of said medium.

5. Apparatus as claimed in claim 4 wherein said test image includes about 256 steps of different color densities.

6. Apparatus as claimed in claim 5 including
   a plurality of test images and a plurality of look-up tables each of said look-up tables including data correlating the control signals associated with a particular color density of an associated test image.

7. The invention claimed comprises
in an automatic spray painting system for the production of color images having a plurality of different spray heads and means for causing said heads to scan across a sheet medium, the method of automatically calibrating the system to reproduce color images comprising the steps of scanning a selected spray head across the medium, spraying pulses of ink from said head onto said medium with changing density produced by modulation of an air stream connected to said head as the head traverses said medium to produce a test image, spraying an initial fiducial mark on said test image to denote the beginning thereof, spraying a terminal fiducial mark on said test image to indicate the termination thereof, measuring the color density of selected areas of said image, correlating the color density at said areas with the air modulation that produced the particular areas, recording such correlations in a look-up table, and during the reproduction of a color image, controlling the modulation of said air flow in accordance with data from said table thereby to produce a color image of improved fidelity.

8. The method as claimed in claim 7 including the step of
forming a series of discreet color steps in said test image having at least 128 different levels of color density.

9. The claimed invention is a computer controlled automatic spray system for reproducing a color image comprising
a computer,
a flexible sheet medium,
a plurality of spray heads positioned adjacent said medium,
a plurality of ink source connected to said heads,
means for creating relative scanning motion between the spray heads and the medium,
means for varying the rate of spraying of ink by each of said heads in accordance with the color characteristics of the image to be reproduced,
means under the control of said computer for generating a test image produced by varying the rate of ink sprayed by a selected one of said heads whereby said test pattern comprises variable color density in steps from a minimum to a maximum,
said test image including an initial and terminal fiducial marks in predetermined positions relative to said steps for denoting, respectively, the beginning and the end of said test image,
a densitometer,
means providing scanning motion between said densitometer and said test image,
means recording the step-by-step correlations between the rate of ink sprayed by the selected head to produce the color at each of said steps and the color density as registered by said densitometer, and
means operable during the reproduction of said color image for adjusting the rate of ink sprayed by the selected spray head in accordance with said correlations thereby to reproduce accurately the colors of said image.

10. Apparatus as claimed in claim 9 including
a carriage supporting said selected head and said densitometer, and
means for causing said carriage to reciprocate across said medium.

11. Apparatus as claimed in claim 10 including
first and second sets of spray heads comprising a total of at least eight spray heads, and
at least four supply ink tanks each connected to two of said spray heads.

12. Apparatus as claimed in claim 11 wherein
said test image includes at least eight sets of discrete color steps each set associated directly with a particular one of said spray heads.

13. Apparatus as claimed in claim 11 including
means forming an interleaved spray pattern consisting of alternate lines produced by said first and second sets of spray heads.

* * * * *